US 9,776,515 B2

(12) United States Patent
Kunz et al.

(10) Patent No.: US 9,776,515 B2
(45) Date of Patent: Oct. 3, 2017

(54) CONTROL DEVICE FOR A HYDRAULIC BRAKING SYSTEM OF A VEHICLE, HYDRAULIC BRAKING SYSTEM FOR A VEHICLE, AND METHOD FOR OPERATING A HYDRAULIC BRAKING SYSTEM OF A VEHICLE

(71) Applicant: Robert Bosch GmbH, Stuttgart (DE)

(72) Inventors: Michael Kunz, Steinheim an der Murr (DE); Ralf-Peter Jaime, Heilbronn (DE); Stefan Strengert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/888,588

(22) PCT Filed: Apr. 16, 2014

(86) PCT No.: PCT/EP2014/057752
§ 371 (c)(1),
(2) Date: Nov. 2, 2015

(87) PCT Pub. No.: WO2014/177384
PCT Pub. Date: Nov. 6, 2014

(65) Prior Publication Data
US 2016/0059706 A1   Mar. 3, 2016

(30) Foreign Application Priority Data
May 2, 2013   (DE) .......... 10 2013 208 036

(51) Int. Cl.
*B60L 7/26*   (2006.01)
*B60T 8/48*   (2006.01)
(Continued)

(52) U.S. Cl.
CPC .............. *B60L 7/26* (2013.01); *B60T 8/4072* (2013.01); *B60T 8/4086* (2013.01); *B60T 8/4872* (2013.01); *B60T 13/686* (2013.01)

(58) Field of Classification Search
CPC .......... B60T 8/00; B60T 8/441; B60T 8/4072; B60T 11/108; B60L 3/16; B60L 3/147;
(Continued)

(56) References Cited

U.S. PATENT DOCUMENTS 5,853,229 A   12/1998 Willmann et al.
7,925,411 B2 *  4/2011 Fuhrer ................ B60L 7/16
                                                180/165
(Continued)

FOREIGN PATENT DOCUMENTS

DE      19604134      8/1997
DE    102011005822    9/2012
(Continued)

OTHER PUBLICATIONS

International Search Report for PCT/EP2014/057752, issued on Jul. 17, 2014.

*Primary Examiner* — Robert A Siconolfi
*Assistant Examiner* — San Aung
(74) *Attorney, Agent, or Firm* — Norton Rose Fulbright US LLP; Gerard Messina

(57) ABSTRACT

A control device is provided for a hydraulic braking system of a vehicle, including an actuating device which is designed for outputting, at least temporarily, at least one first control signal and at least one second control signal in at least a first operating mode, taking into account at least one sensor signal. A known hydraulic braking system may be controlled with the aid of the control signals, output by the actuating device, in such a way that during an activation of a brake actuating element, at least one blending valve of a first brake
(Continued)

circuit which is connected to the master brake cylinder via a first changeover valve is controlled into an at least partially open state in such a way that brake fluid is displaceable into at least one storage chamber.

14 Claims, 4 Drawing Sheets

(51) Int. Cl.
*B60T 13/68* (2006.01)
*B60T 8/40* (2006.01)

(58) Field of Classification Search
CPC .......... B60L 3/586; B60L 3/665; B60L 3/686; B60L 7/24; B64C 25/44
USPC .......... 303/3, 10, 113.1–113.5, 114.3, 116.1, 303/116.2, 116.4, 119.1, 151, 152, 186
See application file for complete search history.

(56) References Cited

U.S. PATENT DOCUMENTS

| | | | | |
|---|---|---|---|---|
| 2010/0198475 A1* | 8/2010 | Stolzl | ........................ | B60L 7/18 701/74 |
| 2010/0276240 A1* | 11/2010 | Wuerth | ................... | B60L 7/003 188/358 |
| 2013/0049450 A1* | 2/2013 | Kunz | ...................... | B60T 8/267 303/3 |
| 2013/0057052 A1* | 3/2013 | Kunz | ...................... | B60T 8/267 303/3 |
| 2013/0093237 A1* | 4/2013 | Dinkel | ................. | B60T 13/141 303/10 |

FOREIGN PATENT DOCUMENTS

| | | |
|---|---|---|
| WO | WO2008/058985 | 5/2008 |
| WO | WO2009/089944 | 7/2009 |
| WO | WO2011/160963 | 12/2011 |

* cited by examiner

CONTROL DEVICE FOR A HYDRAULIC BRAKING SYSTEM OF A VEHICLE, HYDRAULIC BRAKING SYSTEM FOR A VEHICLE, AND METHOD FOR OPERATING A HYDRAULIC BRAKING SYSTEM OF A VEHICLE

FIELD OF THE INVENTION

The present invention relates to a control device for a hydraulic braking system of a vehicle. Moreover, the present invention relates to a hydraulic braking system for a vehicle. Furthermore, the present invention relates to a method for operating a hydraulic braking system of a vehicle.

BACKGROUND INFORMATION

Braking systems and methods for operating the braking systems are described in German Published Patent Application No. 10 2011 005 822. The braking systems in each case have a decoupleable brake circuit which is connected to a master brake cylinder via a shutoff valve. In addition, the decoupleable brake circuit is connected to a brake fluid reservoir via a pressure relief valve.

SUMMARY

The present invention provides a control device for a hydraulic braking system of a vehicle, a hydraulic braking system for a vehicle, and a method for operating a hydraulic braking system of a vehicle.

The present invention allows a driver to brake the first brake circuit at any time. For example, even when the (first) changeover valve is closed, the driver may override the check valve situated/connected in parallel to the changeover valve. Thus, even in an error situation, for example after a failure of the vehicle electrical system, it is still reliably ensured that the driver is able to actively brake the first brake circuit. Since the first brake circuit itself is not disconnected from the master brake cylinder, and thus from the driver, even after the first changeover valve closes, the disadvantages of a complete disconnection of a brake circuit cannot occur. The present invention thus avoids the disadvantages of by-wire braking systems which typically occur on a frequent basis.

In addition, during a braking operation, at least the first brake pressure in the at least one first wheel brake cylinder may be reduced, initially by at least partially opening the at least one blending valve to a response pressure of the at least one storage chamber, and subsequently by at least partially opening the pressure relief valve to (virtually) atmospheric pressure. The braking effect of the at least one first wheel brake cylinder which is reducible/stoppable in this way may be utilized, for example for blending a generator braking torque of at least one electric motor.

With the aid of the present invention, it is possible to brake purely regeneratively, free of residual pressure. In particular, with the aid of the present invention at least the first brake pressure in the at least one first wheel brake cylinder of the first brake circuit may be reduced to below a response pressure of the storage chamber of the first brake circuit. A second brake pressure which is present in the at least one second wheel brake cylinder of the second brake circuit may also be generally reduced to below the response pressure of the storage chamber. The storage chamber of the first brake circuit, such as a low-pressure storage chamber for temporary volume storage, for example, may thus be utilized without having to accept the disadvantage of a first brake pressure and/or second brake pressure which is equal to the response pressure of the storage chamber. As explained in greater detail below, with the aid of the present invention it is thus possible to advantageously increase the regenerative efficiency of a braking system. The present invention may therefore additionally be used to motivate a driver to use an energy-saving, lower-emission vehicle.

It is expressly pointed out that the present invention may be even further utilized, even after the "jump-in" range for a temporary volume storage is exceeded. For this reason, the usability of the present invention does not require a limitation of regenerative braking to the jump-in range. Thus, a heavy brake actuation may also be utilized for rapid charging of a vehicle battery. The present invention thus contributes to regeneratively recovering preferably a great amount of energy during a deceleration of the vehicle, and thus to reducing fuel consumption and pollutant emissions of a vehicle. In addition, the present invention does not result in the disadvantages of a brake-by-wire braking system. Instead, by utilizing the present invention, the driver always has the option of also braking the second brake circuit, connected to the brake fluid reservoir, by bypassing the second changeover valve.

In one advantageous specific embodiment, the actuating device is designed for outputting the at least one first control signal to at least one wheel outlet valve of the first brake circuit as the at least one blending valve. Thus, a valve which is generally always present may be utilized as the at least one blending valve. The present invention thus allows a limitation of at least the first brake pressure of the first brake circuit without equipping it with a new valve.

The manufacturing costs and the space requirements of the braking system are reducible in this way.

The actuating device is preferably also designed for outputting the at least one first control signal and/or the at least one second control signal, additionally taking into account at least one provided piece of information concerning an actual maximum generator braking torque which is instantaneously achievable with the aid of at least one electric motor. The present invention may thus be used in a targeted manner in situations in which the at least one electric motor is available for decelerating the vehicle in generator mode. However, if the speed of the vehicle is below a minimum initiation speed for operating the at least one electric motor in generator mode, or the vehicle battery is already fully charged, deceleration may be carried out purely hydraulically with the aid of the hydraulic braking system. It may thus be ensured that a lack of usability of the at least one electric motor for decelerating the vehicle in generator mode is reliably bridgeable.

In one advantageous refinement, for limiting or preventing an increase in at least the first brake pressure in the at least one first wheel brake cylinder of the first brake circuit despite activating the brake actuating element, the actuating device, in a second operating mode, is additionally designed for leaving the at least one blending valve in its closed state, and for controlling the pressure relief valve into the at least partially open state in such a way that brake fluid is displaceable into the brake fluid reservoir, which is connected to the pressure relief valve on the output side. Two different blending strategies may thus be carried out with the aid of the actuating device. In one preferred specific embodiment, the actuating device may be controllable in a targeted manner into the operating mode, from at least the first operating mode and the second operating mode, which is preferred with regard to a state of at least one component of the vehicle equipped with the control device, an ambient condition, and/or a traffic situation.

The advantages described in the preceding paragraphs are also ensured with a hydraulic braking system for a vehicle which includes this type of control device. This also applies when the hydraulic braking system is designed for an X brake circuit division.

In addition, the above-described advantages are achievable by carrying out a corresponding method for operating a hydraulic braking system of a vehicle.

DETAILED DESCRIPTION

Figure 1:
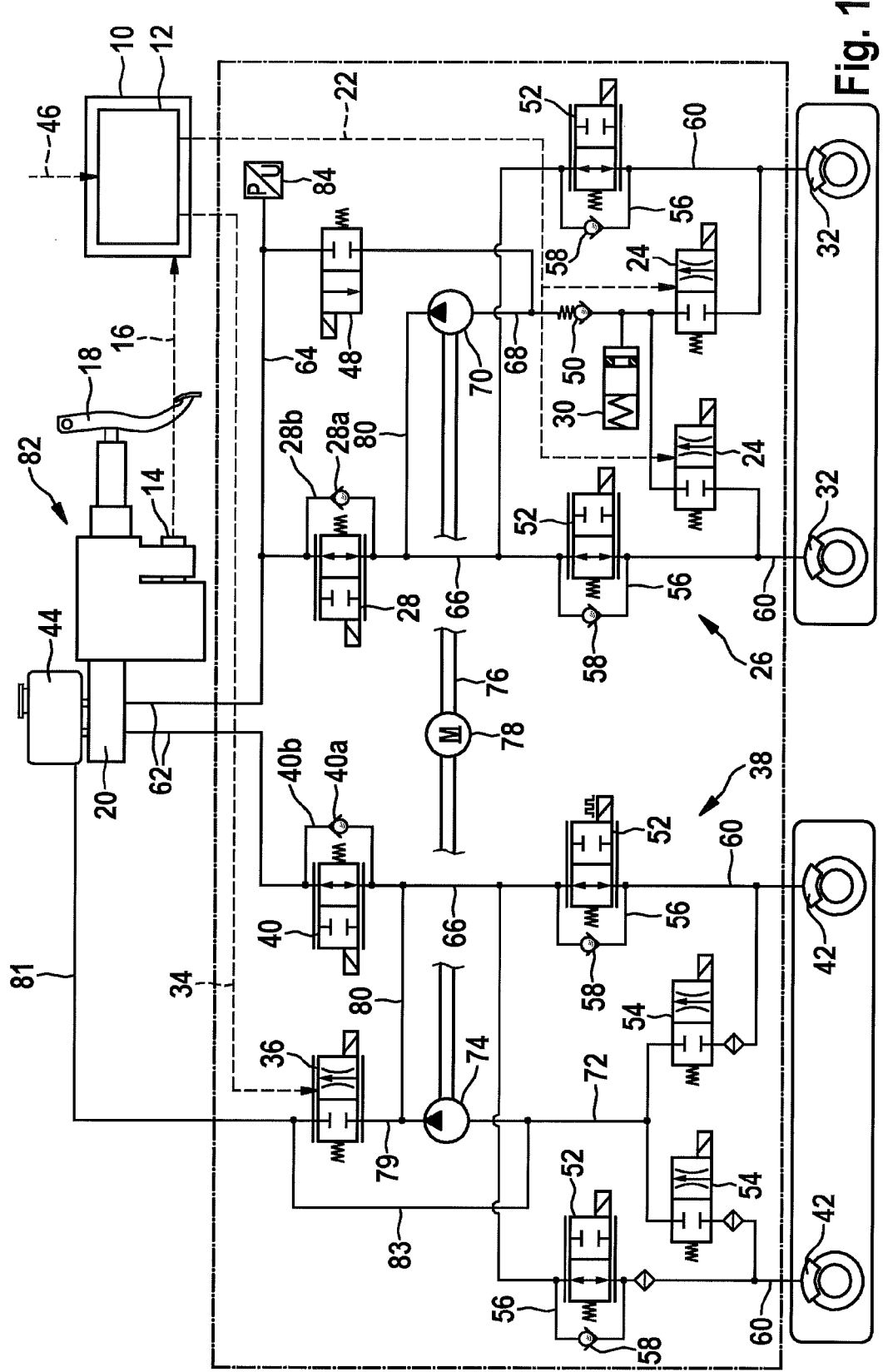
FIG. 1 shows a schematic illustration of a first specific embodiment of the control device and a braking system equipped with same.

FIG. 1 shows a schematic illustration of a first specific embodiment of the control device and a braking system equipped with same.

Control device 10 schematically illustrated in FIG. 1 includes an actuating device 12 which, at least in a first operating mode, is designed for taking into account at least one sensor signal 16 provided by at least one brake actuating element sensor 14. The at least one brake actuating element sensor 14 may be, for example, a brake actuation travel sensor, such as in particular a pedal travel sensor, a differential travel sensor, and/or a rod travel sensor, a driver brake force sensor, and/or a driver brake pressure sensor. However, the design of brake actuating element sensor 14 is not limited to the types of sensors listed here. The at least one provided sensor signal 16 thus includes a piece of information concerning an activation intensity of an activation of a brake actuating element 18 of the braking system, including control device 10, by a driver, for example a driver brake force, a driver brake pressure, and/or a displacement travel of at least one component of brake actuating element 18. Brake actuating element 18 may be a brake pedal 18, for example.

Actuating device 12, at least in the first operating mode, is designed for outputting, at least temporarily, at least one first control signal 22 during an activation of brake actuating element 18 connected to a master brake cylinder 20 of the hydraulic braking system, taking into account the at least one sensor signal 16. The at least one first control signal 22 is outputtable to at least one blending valve 24 of a first brake circuit 26 of the hydraulic braking system, which is connected to master brake cylinder 20 via a first changeover valve 28 of first brake circuit 26. With the aid of the at least one first control signal 22, the at least one blending valve 24 is controllable into an at least partially open state in such a way that brake fluid is displaceable into at least one storage chamber 30 of first brake circuit 26.

In particular, a brake fluid volume which (virtually) corresponds to a volume of brake fluid which is displaced from master brake cylinder 20 into first brake circuit 26 due to activation of brake actuating element 18 may thus be displaceable into the at least one storage chamber 30 of first brake circuit 26. By outputting the at least one first control signal 22 to the at least one blending valve 24, it may thus be ensured that, despite activating brake actuating element 18, at least a first brake pressure which is present in at least one first wheel brake cylinder 32 of first brake circuit 26 is limitable to a predefined, comparatively low pressure. In this case, the first brake pressure, at least in the at least one first wheel brake cylinder 32 of first brake circuit 26, is generally limitable to a response pressure of the at least one storage chamber 30.

The at least one storage chamber 30 may be, for example, a low-pressure storage chamber of first brake circuit 26. By outputting the at least one first control signal 22, it may thus be ensured that, despite activating brake actuating element 18 by the driver, at least the first brake pressure which is present in the at least one first wheel brake cylinder 32 of first brake circuit 26 remains limited to the response pressure of the low-pressure storage chamber.

The driver of the vehicle equipped with control device 10/the hydraulic braking system thus has the option at any time of directly braking at least first brake circuit 26 by activating a brake actuating element 18 which is connected to master brake cylinder 20. At the same time, brake fluid/a volume may be discharged from first brake circuit 26 into the at least one storage chamber 30 in order to counteract an undesirable pressure build-up in the at least one first wheel brake cylinder 32. Control device 10/the hydraulic braking system thus offers the advantages of selective reducibility of at least the first brake pressure which is present in at least one first wheel brake cylinder 32, without a design of first brake circuit 26 as a by-wire brake circuit. The advantages of the selective reducibility of at least the first brake pressure may therefore be utilized without having to accept the disadvantages/problems of a by-wire brake circuit for first brake circuit 26.

When the braking system is equipped with a second brake circuit 38 and a master brake cylinder 20 which includes a floating piston (not illustrated) between the two pressure chambers of the two brake circuits 26 and 38, in addition a second brake pressure which is present in at least one second wheel brake cylinder 42 of second brake circuit 38 is limitable to the response pressure of the at least one storage chamber 30, despite activating brake actuating element 18. The combined limitability/reducibility of the first brake pressure and of the second brake pressure is automatically ensured with a master brake cylinder 20 which includes a floating piston, an open first changeover valve 28, and an "open" hydraulic connection of second brake circuit 38 to master brake cylinder 20.

In addition, with the aid of actuating device 12 (which is controlled at least into the first operating mode), at least one second control signal 34 is also outputtable to a pressure relief valve 36 of second brake circuit 38 of the hydraulic braking system, which is connected to master brake cylinder 20 via a second changeover valve 40 of second brake circuit 38 and which includes the at least one second wheel brake cylinder 42, at least taking into account the at least one sensor signal 16. With the aid of the at least one second control signal 34, pressure relief valve 36 is controllable into an at least partially open state in such a way that brake fluid is displaceable into a brake fluid reservoir 44 connected to pressure relief valve 36 on the output side. At least the first brake pressure which is present in the at least one first wheel brake cylinder 32 of first brake circuit 26 is additionally reducible in this way. In particular, at least the first brake pressure which is present in the at least one first wheel brake cylinder 32 of first brake circuit 26 may be reduced to below the response pressure of the at least one storage chamber 30 by at least partially opening the pressure relief valve. In this way, a first brake pressure at (virtually) atmospheric pressure is achievable at least in the at least one first wheel brake cylinder 32 of first brake circuit 26, despite activating brake actuating element 18.

Furthermore, by at least partially opening pressure relief valve 36, the second brake pressure which is present in the at least one second wheel brake cylinder 42 of second brake circuit 38 is also reducible to below the response pressure of the at least one storage chamber 30. By at least partially opening pressure relief valve 36 (with changeover valves 28 and 40 open), it is thus ensurable that a brake pressure of (virtually) the pressure in brake fluid reservoir 44/atmospheric pressure is simultaneously present in the two brake circuits 26 and 38. This may also be referred to as a pressure regulation at the master brake cylinder level, with changeover valves 28 and 40 open. An overall frictional braking torque which is exertable on the associated wheels with the aid of wheel brake cylinders 32 and 42 of the two brake circuits 26 and 38, respectively, is thus reducible to (virtually) zero by controlling pressure relief valve 36 with the aid of control device 10, despite activating brake actuating element 18.

The braking effect of the at least one first wheel brake cylinder 32 and of the at least one second wheel brake cylinder 42, which is preventable with the aid of control signals 22 and 34 despite activating brake actuating element 18, may be utilized for using at least one electric motor (not illustrated) in generator mode. The at least one electric motor, which frequently is also usable as an electric drive motor of the vehicle, is operated in such a way that a generator braking torque for (additional) deceleration of the vehicle is effectuated. Electrical energy which is recovered in this way may be fed back into a vehicle battery. Due to the prevented braking effect of the at least one first wheel brake cylinder 32 and of the at least one second wheel brake cylinder 42, by using the at least one electric motor in generator mode, the vehicle battery may be charged without exceeding a setpoint vehicle deceleration which is predefinable by the driver by activating brake actuating element 18 during the charging operation. Instead, the at least one electric motor may be controlled in such a way that the setpoint vehicle deceleration predefined by the driver is precisely maintained. The present invention thus allows comparatively rapid charging of the vehicle battery while reliably maintaining the setpoint vehicle deceleration predefined by the driver. Control device 10 thus achieves reduced fuel consumption and lower pollutant emissions of the vehicle thus equipped, with reliable braking comfort.

Pressure relief valve 36 is preferably a continuously adjustable/continuously controllable valve. In this case, pressure relief valve 36 may also be referred to as a continuously regulatable valve. However, it is pointed out that the design of pressure relief valve 36 is not limited to a specific type of valve.

Brake fluid reservoir 44 may be understood to mean a volume in which atmospheric pressure is present, and/or which is connected to master brake cylinder 20 via at least one replacement bore, such as a balancing bore, for example. However, brake fluid reservoir 44 may also be hydraulically connected to a master brake cylinder 20 via a central valve.

First changeover valve 28 is understood in particular to mean a valve which includes a check valve 28a in a bypass line 28b which extends in parallel to changeover valve 28. Check valve 28a is preferably oriented in such a way that it is overpressurable with the aid of a pressure in master brake cylinder 20. In addition, a bypass line 40b which includes a check valve 40a which is overpressurable with the aid of the pressure in master brake cylinder 20 may extend in parallel to second changeover valve 40. The driver of the vehicle equipped with control device 10/the hydraulic braking system thus has the option of directly braking the two brake circuits 26 and 38. A brake pressure build-up in all wheel brake cylinders 32 and 42 which is effectuated solely by the driver brake force is still reliably achievable, even when changeover valves 28 and 40 are closed.

Actuating device 12 is preferably additionally designed for outputting the at least one first control signal 22 and/or the at least one second control signal 34, additionally taking into account at least one provided piece of information 46 concerning a maximum actual generator braking torque which is instantaneously achievable with the aid of the at least one electric motor. Control device 10 may thus also take into account that the at least one electric motor is not usable in certain situations, for example due to the vehicle battery being fully charged or the vehicle speed being too low.

Actuating device 12 is preferably designed for outputting the at least one first control signal 22 to at least one wheel outlet valve 24 of first brake circuit 26 as the at least one blending valve 24. Thus, a valve 24 which is generally already present in a brake circuit 26 may be utilized for transferring brake fluid into the at least one storage chamber 30. Therefore, first brake circuit 26 does not have to be equipped with an additional valve as the at least one blending valve 24. However, it is pointed out that a high-pressure switching valve 48 of first brake circuit 26 may also be used as the at least one blending valve 24. In this case it is advantageous to dispense with providing a check valve 50 between high-pressure switching valve 48 and the at least one storage chamber 30. Other types of valves may also be used for the at least one blending valve 24.

In one advantageous refinement, for limiting or preventing an increase in at least the first brake pressure in the at least one first wheel brake cylinder 32 of first brake circuit 26, actuating device 12, in a second operating mode, is additionally designed for leaving the at least one blending valve 24 in its closed state despite activating brake actuating element 18, and for controlling pressure relief valve 36 into the at least partially open state in such a way that brake fluid is displaceable into brake fluid reservoir 44, which is connected to pressure relief valve 36 on the output side.

Control device 10 is usable in a number of various hydraulic braking systems of a vehicle.

The following descriptions concerning the braking system in FIG. 1 are therefore to be interpreted solely as examples:

Brake circuits 26 and 38 illustrated in FIG. 1 in each case include two wheel brake cylinders 32 and 42, respectively. However, it is pointed out that the usability of control device 10 is not limited to a specific number of wheel brake cylinders 32 and 42 present in a brake circuit 26 and 38. A wheel inlet valve 52 is associated with each of wheel brake cylinders 32 and 42, and a wheel outlet valve 24, 54 is associated with each wheel brake cylinder 32 and 42, respectively. Each wheel inlet valve 52 includes a bypass line 56 with a check valve 58 situated therein. Wheel inlet valves 52 and wheel outlet valves 24 and 54 are connected to associated wheel brake cylinder 32 and 42 via forking lines 60.

Each changeover valve 28 and 40 is connected to master brake cylinder 20 via one supply line 62 each. In addition, high-pressure switching valve 48 of first brake circuit 26 is connected to supply line 62 of first brake circuit 26 via a line 64. A branching line 66 leads from each changeover valve 28 and 40 to wheel inlet valves 52 of respective brake circuits 26 and 38. Wheel outlet valves 24 of first brake circuit 26 are connected to an intake side of a first pump 70 via a further forking line 68, the at least one storage chamber 30 and check valve 50 preferably being situated between wheel outlet valves 24 and first pump 70. In addition, wheel outlet valves 54 of second brake circuit 38 are connected to an intake side of a second pump 74 via a further branching line 72.

The two pumps 70 and 74 may be situated on a shared shaft 76 of a motor 78. The two pumps 70 and 74 may be designed as single-piston pumps, for example. The hydraulic braking system in FIG. 1 may thus be referred to as a modified standard modulation system, in particular as a double-piston ESP system. However, the braking system may also be designed with modulation systems having a different design, for example pumps which include multiple pistons, asymmetrical pumps, and/or gear pumps. Each of pumps 70 and 74 is connected at its pressure side to line 66 of associated brake circuit 26 and 38 via a line 80.

A further line 79 via which the pressure side of second pump 74 is connected to pressure relief valve 36 opens into line 80 in the second brake circuit. Pressure relief valve 36 is connected to brake fluid reservoir 44 via a suction line 81. A further line 83 extends from suction line 81 to line 72, in parallel to pressure relief valve 36 and second pump 74.

Each of the two brake circuits 26 and 38 may be equipped with a pressure sensor 84. For example, first brake circuit 26 may include a pilot pressure sensor 84. However, the design of the hydraulic braking system is not limited to equipping it with specific pressure sensors 84.

The braking system in FIG. 1 includes a brake booster 82 which is situated between brake actuating element 18, designed as a brake pedal, and master brake cylinder 20. Brake booster 82 may be an electromechanical brake booster 82, for example. The braking system in FIG. 1 thus allows a vacuum-free design of the brake booster. However, the design of brake booster 82 is not limited to this type. Equipping the hydraulic braking system with brake booster 82 is likewise optional.

The braking system in FIG. 1 is thus a combination of an electromechanical brake booster 82 and a modified ESP system, and is particularly suited for vehicles which include X brake circuit division. This may also be described in that the hydraulic braking system is advantageously designed for an X brake circuit division. An X brake circuit division may be understood to mean that the wheels which are associatable with a brake circuit 26 and 38 are situated diagonally on a vehicle. In comparison to other conventional hydraulic braking systems which include X brake circuit division, the braking system in FIG. 1 has the advantage that the brake pressure present in all brake cylinders 32 and 42 is settable to (virtually) zero during regenerative braking. Therefore, an undesirable hydraulic residual pressure in wheel brake cylinders 32 and 42 does not have to be accepted during recuperative braking.

Electromechanical brake booster 82 also achieves an actively changeable boost characteristic which is adaptable to a blending operation. During the activation of brake actuating element 18, the assisting force which is provided with the aid of electromechanical brake booster 82 may advantageously be adapted to the first brake pressure and/or to the second brake pressure. For example, the assisting force may be reduced after/during transfer of brake fluid into the at least one storage chamber 30 in such a way that the driver detects no effects, in terms of force, of the brake fluid displacement. Similarly, a standard brake actuation feel (pedal feel) may also be achieved by increasing the assisting force, despite transferring brake fluid from the at least one storage chamber 30. The braking system in FIG. 1 thus allows an advantageous (standard) brake actuation feel (pedal feel) for a driver, even during blending of a generator braking torque of the at least one electric motor which varies over time.

The braking system in FIG. 1 simultaneously ensures force blending and volume blending.

Due to the achievable force blending, braking may be selectively carried out purely hydraulically or hydraulically, and regeneratively or purely regeneratively. The driver braking input may thus be reliably carried out, even in situations in which the instantaneously available generator braking torque of the at least one electric motor operable in generator mode is not sufficient to completely implement the driver braking input. Due to the volume blending which may be carried out at the same time, it is ensurable that the driver detects no changed activation characteristic during the activation of brake actuating element 18, despite a change between purely regenerative braking or regenerative braking and hydraulic braking or purely hydraulic braking.

Figure 2:
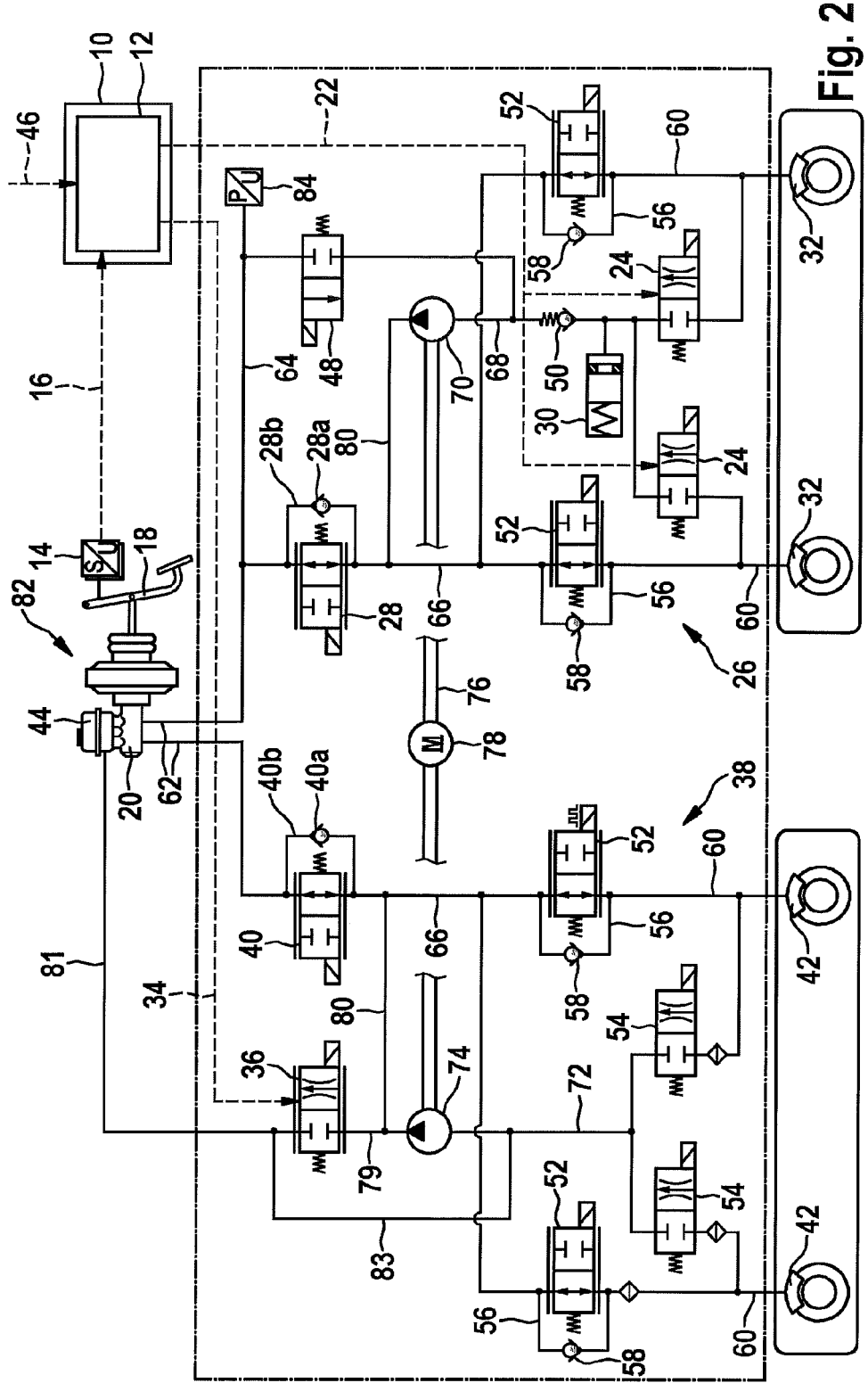
FIG. 2 shows a schematic illustration of a second specific embodiment of the control device and the braking system equipped with same.
Figure 3A:
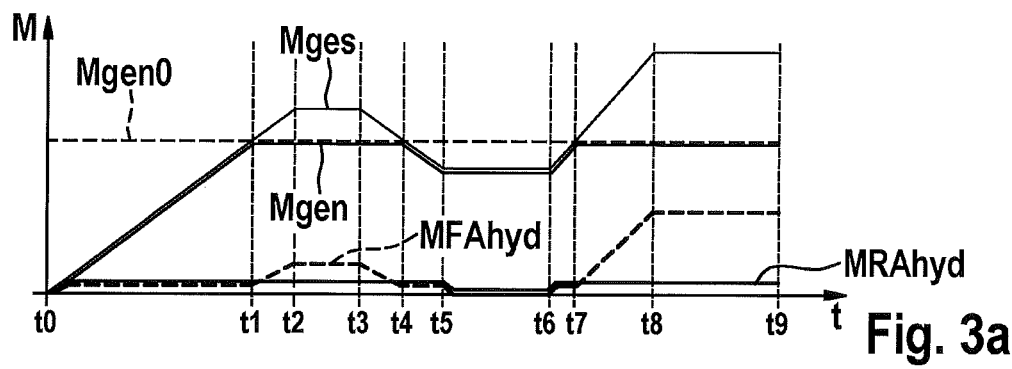
FIGS. 3a through 3e show coordinate systems for explaining a first specific embodiment of the method for operating a hydraulic braking system of a vehicle.
Figure 3B:
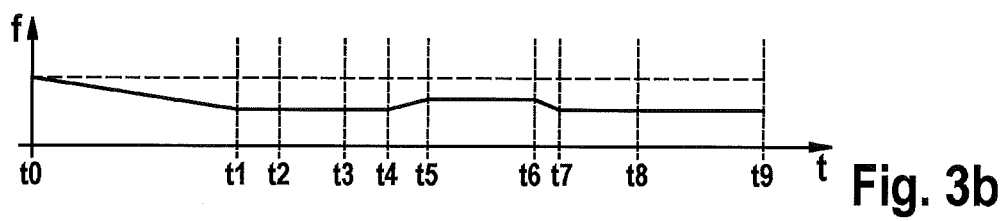
Figure 3C:
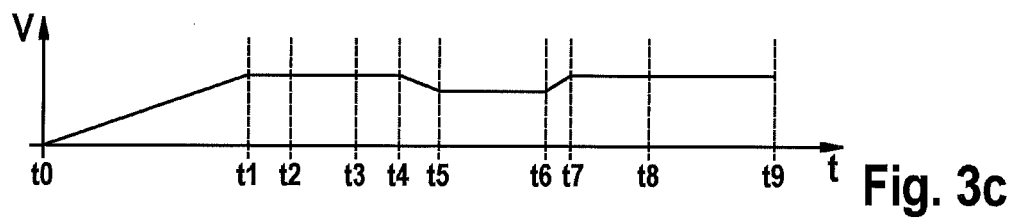
Figure 3D:
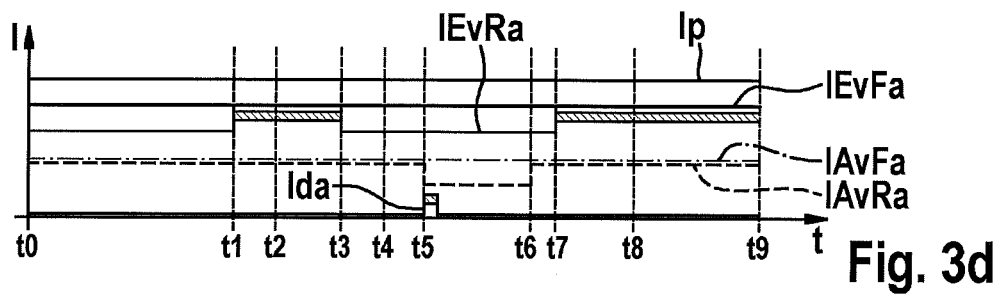
Figure 3E:
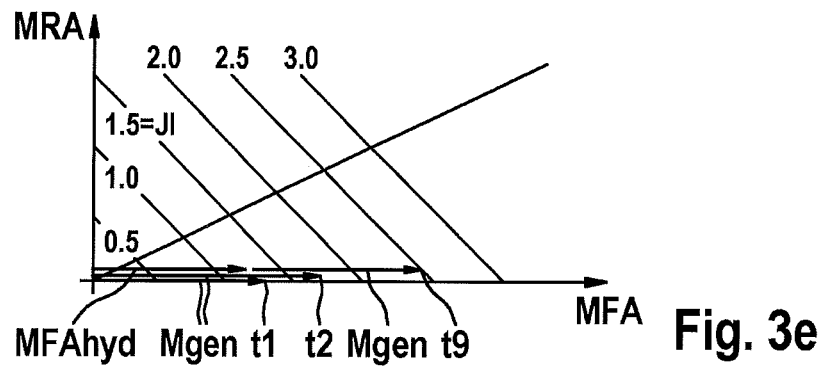
Figure 4A:
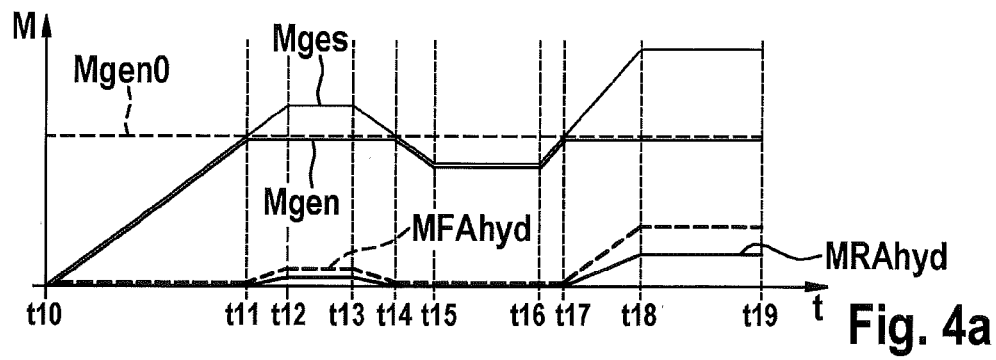
FIGS. 4a through 4e show coordinate systems for explaining a second specific embodiment of the method for operating a hydraulic braking system of a vehicle.
Figure 4B:
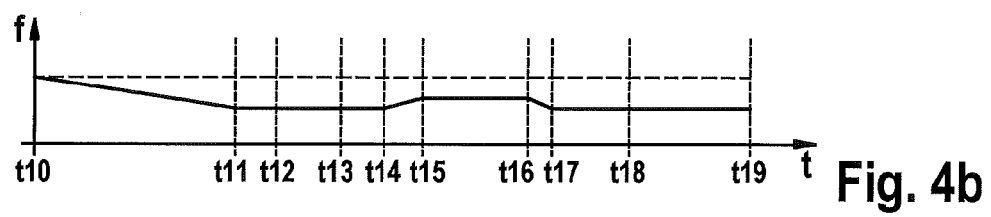
Figure 4C:
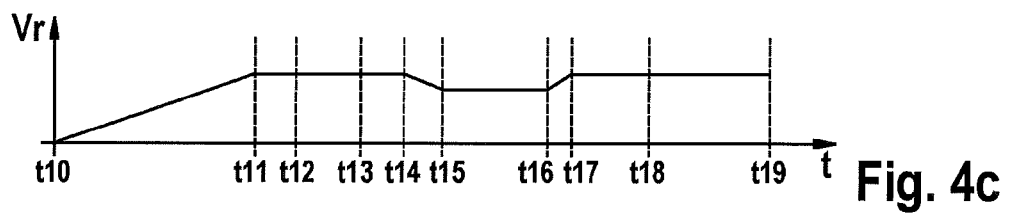
Figure 4D:
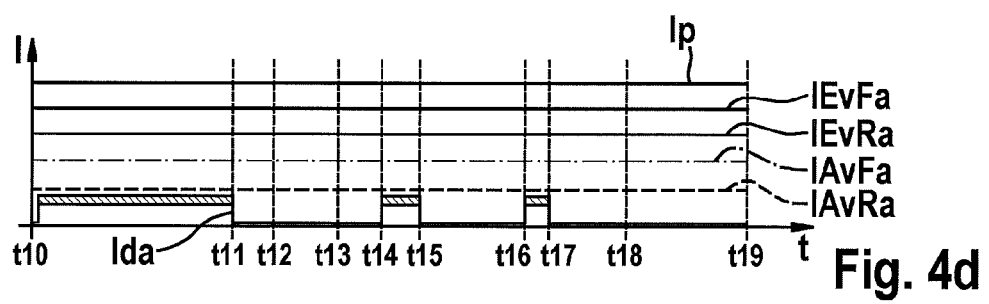
Figure 4E:
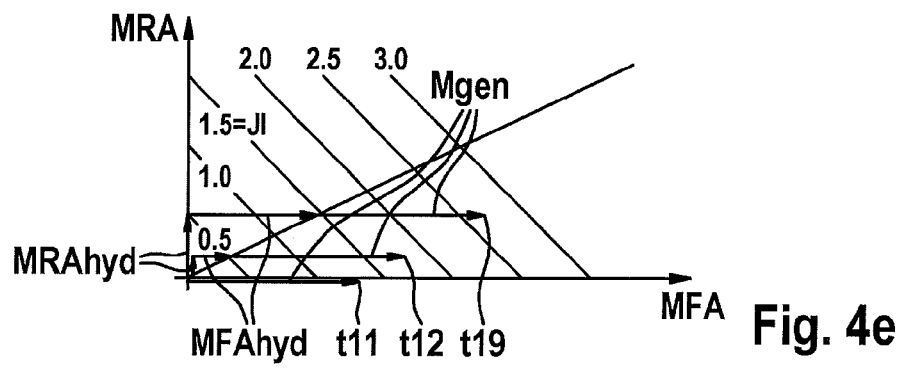

FIG. 2 shows a schematic illustration of a second specific embodiment of the control device and the braking system equipped with same.

The braking system schematically illustrated in FIG. 2, in contrast to the specific embodiment previously described, includes a vacuum brake booster 82 as brake booster 82. Otherwise, the braking system in FIG. 2 has all braking system components already stated above.

The braking system in FIG. 2 also ensures the advantageous volume blending described above. In contrast, the force blending function, which may be carried out with the aid of electromechanical brake booster 82, cannot be achieved by vacuum brake booster 82. However, this may be remedied by optionally limiting the regenerative braking effect to a jump-in range of vacuum brake booster 82. Even in a vacuum brake booster 82, within the jump-in range there is generally no direct coupling between brake actuating element 18 and master brake cylinder 20. Thus, during blending within the jump-in range, the driver does not detect whether braking is carried out purely hydraulically or hydraulically and regeneratively or purely regeneratively. A good brake actuation feel (pedal feel) for the driver is thus ensured, even for this type of brake booster.

Control devices 10/the braking systems described above may advantageously be used in particular in a hybrid vehicle or in an electric vehicle. However, the usability of control devices 10/the braking systems is not limited to a specific vehicle type.

It is pointed out once more that the braking systems described above are suitable for an X brake circuit division as well as for an II brake circuit division. Therefore, it is not necessary to develop different control devices 10 for braking systems having different designs. Control device 10 may therefore be manufactured on the same production line, regardless of the brake circuit division, which reduces the product variance. For example, only one hydraulic unit, one ECU, and one software variant is needed in each case, regardless of the brake circuit division. Since larger quantities of control device 10 are thus usable, their cost is also reduced. In addition, the advantages of a parallel pressure build-up in both brake circuits during the blending may also be utilized for vehicles which include X brake circuit division.

Active/autonomous pressure build-ups, i.e., braking requests without activating brake actuating element 18 by the driver, such as in a conventional braking system, may also be achieved for the braking systems described above via pumps 70 and 74, high-pressure switching valve 48, closed pressure relief valve 36, closed changeover valves 28 and 40, and closed wheel outlet valves 24 and 54. In the braking system in FIG. 1, electromechanical brake booster 82 may also be utilized for an active/autonomous pressure build-up. In particular, in the braking system in FIG. 1, the actuator used for the active/autonomous pressure build-up may be selected taking into account desired pressure build-up dynamics, optimized noise generation, and/or a preferred brake actuating element characteristic.

In the event of a failure of the modulation system, the above-described braking systems still have an increased braking function at all wheel brake cylinders 32 and 42. Therefore, there is no concern for functional limitations in such a situation. In the event of a failure of electromechanical brake booster 82 of the braking system in FIG. 1, the driver may still be assisted in the brake actuation with the aid of pumps 70 and 74.

In one advantageous refinement, each control device 10 described above may also be designed for controlling further components of the braking system thus equipped. In one advantageous refinement, actuating device 12 is additionally designed, for example, for controlling at least one pump 70 and 74, taking into account at least the provided piece of information 46 concerning the maximum actual generator braking torque which is instantaneously achievable with the aid of the at least one electric motor, in such a way that a lack of usability of the at least one electric motor may be compensated for, provided that the actual generator braking torque (in the foreseeable future) is less than a generator braking torque which is instantaneously provided with the aid of the at least one electric motor. In this case, control device 10 also achieves transport hydraulics for introducing a volume of brake fluid into at least one of brake circuits 26 and 38.

A control device 10 according to the specific embodiments described above may be integrated, for example, into a braking system control automation system or into a central vehicle control automation system. However, this type of integration of control device 10 is optional.

Control device 10 or actuating device 12 may also be designed for carrying out the method steps described in greater detail below.

FIGS. 3a through 3e show coordinate systems for explaining a first specific embodiment of the method for operating a hydraulic braking system of a vehicle.

The method which is depicted with the aid of the coordinate systems in FIG. 3a through 3e is carried out with X brake circuit division, as an example, for operating the braking system in FIG. 1. Each brake circuit thus includes a front axle wheel brake cylinder with an associated front axle wheel inlet valve and an associated front axle wheel outlet valve, and a rear axle wheel brake cylinder with which a rear axle wheel inlet valve and a rear axle wheel outlet valve are associated. However, it is pointed out that the practicability of the method is not limited to the use of this type of braking system.

In the coordinate systems in FIGS. 3a through 3d, the abscissa is time axis t in each case. An ordinate of the coordinate system in FIG. 3a indicates a braking torque M. An ordinate of the coordinate system in FIG. 3b corresponds to a boost factor f by which the electromechanical brake booster boosts a driver brake force exerted on the brake actuating element by the driver. An ordinate of the coordinate system in FIG. 3c indicates a volume V which is temporarily stored in the at least one storage chamber of the first brake circuit. An ordinate of the coordinate system in FIG. 3d indicates a current intensity I with which various components of the braking system are controlled. While an abscissa of the coordinate system in FIG. 3e indicates a front axle braking torque MFA exerted on a front axle with the aid of the front axle wheel brake cylinder, an ordinate of the coordinate system in FIG. 3e corresponds to a rear axle braking torque MRA exerted on a rear axle with the aid of the rear axle wheel brake cylinder.

When the method is carried out, at least one first brake pressure is limited which is present in the at least one first wheel brake cylinder of a first brake circuit of the hydraulic braking system, which is connected to a master brake cylinder of the hydraulic braking system via a first changeover valve of the first brake circuit. This takes place by controlling, at least temporarily, at least one blending valve of the first brake circuit into an at least partially open state during an activation of a brake actuating element which is connected to the master brake cylinder, for displacing brake fluid into at least one storage chamber of the first brake circuit.

The process described in the preceding paragraph is carried out, for example, between points in time t0 and t1. Prior to point in time t0, a driver of the vehicle equipped with the hydraulic braking system does not activate the brake actuating element. The driver activates the brake actuating element beginning at point in time t0, and thus displaces brake fluid from the master brake cylinder at least into the first brake circuit.

For displacing the brake fluid, for example at least one wheel outlet valve of the first brake circuit, as the at least one blending valve, is controlled, at least temporarily, into the at least partially open state between points in time t0 and t1. For this method step, it is sufficient to use only one of the wheel outlet valves of the first brake circuit. In the illustrated specific embodiment, the rear axle wheel outlet valve, which is designed as a de-energized closed valve, is opened between second t0 and t1 with the aid of a rear axle wheel outlet valve control signal IAvRa, while the front axle wheel outlet valve, likewise designed as a de-energized closed valve, remains closed due to a front axle wheel outlet valve control signal IAvFa, equal to zero. The wheel inlet valves (rear axle wheel inlet valve and front axle wheel inlet valve), designed as de-energized open valves, in each case remain open due to rear axle wheel inlet valve control signal IEvRa and front axle wheel inlet valve control signal IEvFa, equal to zero. A pressure relief valve which is designed as a de-energized closed valve may remain closed between points in time t0 and t1 with the aid of a pressure relief valve control signal Ida, equal to zero. Since operation of the pumps between points in time t0 and t1 is not needed, a pump control signal Ip may also be equal to zero.

The above-described energization of the valves effectuates a brake pressure in all wheel brake cylinders which is equal to a response pressure of the at least one storage chamber, such as a low-pressure storage chamber, for example. Although the driver requests an increasing (setpoint) total braking torque Mges between points in time t0 and t1, the brake pressures present in the wheel brake cylinders thus remain minimal. The limited braking effect of the wheel brake cylinders may be utilized for using at least one electric motor in generator mode. Thus, a comparatively large generator braking torque Mgen is providable between points in time t0 and t1, provided that a maximum providable actual generator braking torque Mgen0 is greater than total braking torque Mges requested by the driver, without exceeding the vehicle deceleration requested by the driver. The vehicle deceleration requested by the driver may thus be recuperatively provided in a high percentage between points in time t0 and t1.

The brake fluid volume displaced from the master brake cylinder into the first brake circuit between points in time t0 and t1 is discharged into the at least one storage chamber, as the result of which volume V temporarily stored in the at least one storage chamber increases between points in time t0 and t1. A lack of pressure force on the electromechanical brake booster due to temporarily stored volume V may be ascertained with the aid of a master brake cylinder pressure sensor. A corresponding reduction in boost factor f between points in time t0 and t1 ensures a force equilibrium between a restoring force, exerted on the brake actuating element by the master brake cylinder, and the sum of the driver brake force and the assisting force of the electromechanical brake booster, despite the increase in temporarily stored volume V.

However, by utilizing at least one low-pressure storage chamber as the at least one storage chamber for temporarily storing volume V, a low hydraulic residual pressure not equal to zero (for example, equal to the response pressure of the storage chamber) remains in all wheel brake cylinders between points in time t0 and t5. The level of the residual pressure is based on the spring stiffness of the restoring spring of the at least one low-pressure storage chamber. The residual pressure effectuates an undesirable residual braking torque for a rear axle wheel brake cylinder braking torque MRAhyd effectuated with the aid of the rear axle wheel brake cylinders, and a front axle wheel brake cylinder braking torque MFAhyd effectuated with the aid of the front axle wheel brake cylinders, and thus prevents desired, purely regenerative braking.

At point in time t1, (setpoint) total braking torque Mges requested by the driver exceeds maximum providable actual generator braking torque Mgen0. (When carrying out the method, the at least one blending valve and/or the pressure relief valve is/are preferably controlled, additionally taking into account at least one provided piece of information concerning an actual maximal generator braking torque Mgen0 which is instantaneously achievable with the aid of at least one electric motor.) Therefore, beginning at point in time t1, while maximum possible actual generator braking torque Mgen0 continues to be requested of the at least one electric motor, an additional hydraulic brake pressure is built up in at least one front axle wheel brake cylinder. For this purpose, the front axle wheel outlet valves remain closed (IAvFa equal to zero). The rear axle wheel inlet valves are at least temporarily closed with the aid of a rear axle wheel inlet valve control signal IEvRa, not equal to zero (delta p control). The volume which is additionally displaced by the driver upon an increase in the braking intent is therefore brought into the front axle wheel brake cylinders. This now results in an increased front axle wheel brake cylinder braking torque MFAhyd, which, together with generator braking torque Mgen and rear axle wheel brake cylinder braking torque MRAhyd, preferably results in (setpoint) total braking torque Mges requested by the driver.

Temporarily stored volume V remains constant beginning at point in time t1. A further reduction in boost factor f beginning at point in time t1 is therefore not necessary.

The driver braking input remains constant between points in time t2 and t3. The driver releases the brake actuating element beginning at point in time t3, thus reducing requested (setpoint) total braking torque Mges. A volume is therefore removed once again from the front axle wheel brake cylinders, beginning at point in time t3, in order to adapt front axle wheel brake cylinder braking torque MFAhyd to reduced (setpoint) total braking torque Mges, while generator braking torque Mgen is still held constant. The rear axle wheel inlet valves may be re-opened with the aid of a rear axle wheel inlet valve control signal IEvRa, equal to zero.

The driver braking input once again falls below maximum achievable actual generator braking torque Mgen0 at point in time t4. Thus, a high percentage of regenerative braking may once again be provided beginning at point in time t4. However, the residual pressure in the wheel brake cylinders continues to effectuate an undesirable residual quantity (not equal to zero) for front axle wheel brake cylinder braking torque MFAhyd and rear axle wheel brake cylinder braking torque MRAhyd, and thus prevents desired, purely regenerative braking.

For additionally reducing at least the first brake pressure which is present in the at least one first wheel brake cylinder of the first brake circuit (to below the response pressure of the at least one storage chamber), the pressure relief valve of the second brake circuit of the hydraulic braking system is therefore controlled into an at least partially open state (Ida not equal to zero), beginning at point in time t5. In this way, brake fluid may be displaced into a brake fluid reservoir which is connected to the pressure relief valve on the output side. The brake pressure in all wheel brake cylinders therefore drops below the response pressure of the at least one storage chamber, beginning at point in time t5. In this way, in particular a pressure at (virtually) atmospheric pressure is generally achievable in all wheel brake cylinders, beginning at point in time t5.

By reducing the brake pressure in all wheel brake cylinders to below the response pressure of the at least one storage chamber, a front axle wheel brake cylinder braking torque MFAhyd and a rear axle wheel brake cylinder braking torque MRAhyd, (virtually) equal to zero, may be ensured beginning at point in time t5. Purely regenerative braking may thus take place beginning at point in time t5. This ensures an advantageously high recuperative efficiency, and thus, comparatively rapid charging of a vehicle battery.

In addition to the increased regenerative efficiency, the method described here also offers the advantage that the volume displaced into the brake fluid reservoir via the (briefly) opened pressure relief valve, beginning at point in time t5, is comparatively small. This volume may therefore be easily conveyed back via the suction line at a later point in time with the aid of only one pump of the second brake circuit. Due to the low pump speed to be provided, little or no noise occurs, and the pump, which has to satisfy only limited demands, has an increased service life.

Point in time t5 may be selected in such a way that a constant driver braking input is present between points in time t5 and t6. However, it is pointed out that the practicability of the advantageous method step is not reduced to this type of brake actuation situation. The rear axle wheel outlet valves may optionally also be closed, beginning at point in time t5, with the aid of a rear axle wheel outlet valve control signal IAvRa, equal to zero.

The driver increases requested (setpoint) total braking torque Mges beginning at point in time t6. (Setpoint) total braking torque Mges exceeds maximum achievable actual generator braking torque Mgen0 at point in time t7. A constant high driver braking input is present between points in time t8 and t9. The method steps already described above may thus be carried out anew between points in time t6 and t9.

In the example in FIGS. 3a through 3e, the advantageous method is carried out using a braking system whose at least one electric motor acts solely on the front axle. Generator braking torque Mgen thus contributes exclusively to front axle braking torque MFA. In addition, in the method described here, front axle wheel brake cylinder braking torque MFAhyd (which enters into front axle braking torque MFA) assumes much higher values than rear axle wheel brake cylinder braking torque MRAhyd (which forms the rear axle braking torque). As is apparent based on the coordinate system in FIG. 3e, the brake force distribution is predominantly on the front axle between points in time t1 and t9.

FIGS. 4a through 4e show coordinate systems for explaining a second specific embodiment of the method for operating a hydraulic braking system of a vehicle.

The method described here may also be carried out with the braking system in FIG. 1 including X brake circuit division. With regard to the abscissas and ordinates of the coordinate systems in FIGS. 4a, 4b, 4c, and 4e, reference is made to FIGS. 3a, 3b, 3c, and 3e. The coordinate system in FIG. 4c has time axis t as the abscissa, while the ordinate indicates a volume Vr temporarily stored in the brake fluid reservoir.

The method schematically depicted with reference to FIGS. 4a through 4e is a refinement of the previously described specific embodiment. The method steps which take place at points in time t10 through t19 may be carried out, for example, before or after the method steps of the previously described specific embodiment. For better understanding of the method steps carried out between points in time t10 and t19, (setpoint) total braking torque Mges requested by the driver corresponds to that at points in time t0 through t9.

When carrying out the method in FIGS. 4a through 4e, an increase at least of the first brake pressure in the first wheel brake cylinder of the first brake circuit is prevented or limited between points in time t10 and t11, despite activating the brake actuating element, in that, while the at least one blending valve is left in its closed state, the pressure relief valve is controlled into the at least partially open state in such a way that brake fluid is displaceable into the brake fluid reservoir connected to the pressure relief valve on the output side. For this purpose, the pressure relief valve is controlled into the at least partially open state between points in time t10 and t11 with the aid of a pressure relief valve control signal Ida, not equal to zero. In contrast, the wheel inlet valves and the wheel outlet valves may remain de-energized between points in time t10 and t11.

In the method in FIGS. 4a through 4e, purely regenerative braking may take place between points in time t10 and t11. The volume displaced by the driver, as temporarily stored volume Vr, may be completely discharged into the brake fluid reservoir via the suction line. It is thus achievable that little or no residual brake pressure is present in the wheel brake cylinders between points in time t10 and t11. At the same time, the level of pressure force which is lacking at the electromechanical brake booster due to temporarily stored volume Vr may be ascertained with the aid of the master brake cylinder pressure sensor. A corresponding reduction of boost factor f of the electromechanical brake booster may nevertheless ensure a force equilibrium at the brake actuating element. Thus, the driver does not detect the displacement of the brake fluid into the brake fluid reservoir.

(Setpoint) total braking torque Mges requested by the driver exceeds maximum achievable actual generator braking torque Mgen0 between points in time t11 and t14. An additional hydraulic braking effect which corresponds to a difference between (setpoint) total braking torque Mges and maximum achievable actual generator braking torque Mgen0 is therefore desired between points in time t11 and t14. For this purpose, the pressure relief valve is closed with the aid of a pressure relief valve control signal Ida, equal to zero. The wheel inlet valves and wheel outlet valves remain de-energized.

The volume which is additionally displaced by the driver between points in time t11 and t12 is brought into all wheel brake cylinders. However, due to differing coefficients of the front axle wheel brake cylinders and of the rear axle wheel brake cylinders, a front axle wheel brake cylinder braking torque MFAhyd which is greater than rear axle wheel brake cylinder braking torque MRAhyd may be effectuated, despite an equal brake pressure in all wheel brake cylinders. Front axle wheel brake cylinder braking torque MFAhyd may be greater than rear axle wheel brake cylinder braking torque MRAhyd by a factor of 2, for example. The brake force distribution is therefore predominantly on the front axle also between points in time t11 and t14. The change in the brake force distribution is thus smaller when a change is made from the purely regenerative braking, prior to point in time t11, to the regenerative and hydraulic braking between points in time t11 and t14. This is illustrated in particular with reference to the coordinate system in FIG. 4e. No further reduction in boost factor f is necessary during points in time t11 through t14.

The driver releases the brake pedal slightly and reduces (setpoint) total braking torque Mges beginning at point in time t13. The hydraulic braking effect may be adapted to the reduced driver braking input between points in time t13 and t14 by removing a volume solely from the wheel brake cylinders. For a driver braking input which is below maximum achievable actual generator braking torque Mgen0 beginning at point in time t14, the pressure relief valve may be re-opened with the aid of a pressure relief valve control signal Ida, not equal to zero. The volume present in the brake circuits may be adapted to the driver braking input by removing a brake fluid volume from the brake fluid reservoir; at the same time, purely regenerative braking takes place and the occurrence of a residual pressure in all wheel brake cylinders is prevented. In addition, boost factor f may be increased between points in time t14 and t15, corresponding to decreasing (setpoint) total braking torque Mges/temporarily stored volume Vr.

The method steps described in the preceding paragraphs may be carried out anew between points in time t16 and t19.

If the maximum achievable actual generator braking torque decreases during points in time t10 to t19, additional volume may be conveyed back from the brake fluid reservoir into the brake circuits via the suction line, with the aid of the at least one pump of the second brake circuit. This effectuates a hydraulic brake pressure in the wheel brake cylinders, which is settable according to desired wheel brake cylinder braking torques MRAhyd and MFAhyd.

A hydraulic residual pressure in all relevant operating situations is also avoided in the refinement described here. Since the wheel outlet valves are opened comparatively infrequently, there is little noise generation associated with the procedure described here.

It is pointed out that in all methods described above, the pressure build-up is fully reversible when a continuously controllable pressure relief valve is used. This increases the functional variability and the possible recuperation efficiency when carrying out the methods.

What is claimed is:

1. A control device for a hydraulic braking system of a vehicle, comprising:
   an actuating device, at least in a first operating mode, for outputting, at least temporarily, at least one first control signal to at least one blending valve of a first brake circuit of the hydraulic braking system, the actuating device being connected to a master brake cylinder via a first changeover valve of the first brake circuit, during an activation of a brake actuating element connected to a master brake cylinder of the hydraulic braking system, taking into account at least one provided sensor signal of at least one brake actuating element sensor, as the result of which at least the one blending valve is controllable into an at least partially open state in such a way that brake fluid is displaceable into at least one storage chamber of the first brake circuit, and at least one first brake pressure which is present in at least one first wheel brake cylinder of the first brake circuit is limitable to a response pressure of the at least one storage chamber, wherein the actuating device, at least in the first operating mode by taking into account the at least one provided sensor signal, is also designed for outputting at least one second control signal to a pressure relief valve of a second brake circuit of the hydraulic braking system, which is connected to the master brake cylinder via a second changeover valve of the second brake circuit and includes at least one second wheel brake cylinder, as a result of which the pressure relief valve is controllable into an at least partially open state in such a way that brake fluid is displaceable into a brake fluid reservoir, which is connected to the pressure relief valve on an output side, and at least the first brake pressure which is present in the at least one first wheel brake cylinder of the first brake circuit is additionally reducible to below the response pressure of the at least one storage chamber.

2. The control device as recited in claim 1, wherein the actuating device outputs the at least one first control signal to at least one wheel outlet valve of the first brake circuit as the at least one blending valve.

3. The control device as recited in claim 1, wherein the actuating device outputs at least one of the at least one first control signal and the at least one second control signal, additionally taking into account at least one provided piece of information concerning an actual maximum generator braking torque which is instantaneously achievable with the aid of at least one electric motor.

4. The control device as recited in claim 1, wherein for limiting or preventing an increase in at least the first brake pressure in the at least one first wheel brake cylinder of the first brake circuit despite activating the brake actuating element the actuating device, in a second operating mode, is designed for leaving the at least one blending valve in its closed state, and for controlling the pressure relief valve into the at least partially open state in such a way that brake fluid is displaceable into the brake fluid reservoir, which is connected to the pressure relief valve on the output side.

5. A hydraulic braking system for a vehicle, comprising:
   a control device for the hydraulic braking system of a vehicle, including:
      an actuating device, at least in a first operating mode, for outputting, at least temporarily, at least one first control signal to at least one blending valve of a first brake circuit of the hydraulic braking system, the actuating device being connected to a master brake cylinder via a first changeover valve of the first brake circuit, during an activation of a brake actuating element connected to a master brake cylinder of the hydraulic braking system, taking into account at least one provided sensor signal of at least one brake actuating element sensor, as the result of which at least the one blending valve is controllable into an at least partially open state in such a way that brake fluid is displaceable into at least one storage chamber of the first brake circuit, and at least one first brake pressure which is present in at least one first wheel brake cylinder of the first brake circuit is limitable to a response pressure of the at least one storage chamber, wherein the actuating device, at least in the first operating mode by taking into account the at least one provided sensor signal, is also designed for outputting at least one second control signal to a pressure relief valve of a second brake circuit of the hydraulic braking system, which is connected to the master brake cylinder via a second changeover valve of the second brake circuit and includes at least one second wheel brake cylinder, as a result of which the pressure relief valve is controllable into an at least partially open state in such a way that brake fluid is displaceable into a brake fluid reservoir, which is connected to the pressure relief valve on an output side, and at least the first brake pressure which is present in the at least one first wheel brake cylinder of the first brake circuit is additionally reducible to below the response pressure of the at least one storage chamber.

6. The hydraulic braking system as recited in claim 5, wherein the hydraulic braking system is for an X brake circuit division.

7. A method for operating a hydraulic braking system of a vehicle, comprising:
   limiting, in a first operating mode, at least one first brake pressure which is present in at least one first wheel brake cylinder of a first brake circuit of the hydraulic braking system, which is connected to a master brake cylinder of the hydraulic braking system via a first changeover valve of the first brake circuit, by controlling, at least temporarily, at least one blending valve of the first brake circuit into an at least partially open state during an activation of a brake actuating element, connected to the master brake cylinder, for displacing brake fluid into at least one storage chamber of the first brake circuit, wherein the at least one brake pressure is limited to a response pressure of the at least one storage chamber; and
   additionally reducing at least the first brake pressure which is present in the at least one first wheel brake cylinder of the first brake circuit to below the response pressure of the at least one storage chamber by controlling a pressure relief valve of a second brake circuit of the hydraulic braking system, which is connected to the master brake cylinder via a second changeover valve of the second brake circuit and which includes at least one second wheel brake cylinder, into an at least partially open state for displacing brake fluid into a brake fluid reservoir connected to the pressure relief valve on an output side.

8. The method as recited in claim 7, further comprising controlling at least one wheel outlet valve of the first brake circuit, as the at least one blending valve, at least temporarily, into the at least partially open state during the activation of the brake actuating element.

9. The method as recited in claim 7, wherein at least one of the at least one blending valve and the pressure relief valve is controlled, additionally taking into account at least one provided piece of information concerning an actual maximal generator braking torque which is instantaneously achievable with the aid of at least one electric motor.

10. The method as recited in claim 7, further comprising one of preventing and limiting an increase in at least the first brake pressure in the at least one first wheel brake cylinder of the first brake circuit, despite activating the brake actuating element, the one of the preventing and the limiting including:
   leaving the at least one blending valve in its closed state; and
   controlling the pressure relief valve into the at least partially open state in such a way that brake fluid is displaced into the brake fluid reservoir, which is connected to the pressure relief valve on the output side.

11. The control device as recited in claim 1, wherein a reduction in a boost factor of a brake booster occurs when the brake actuating element is activated in the first operating mode, and wherein the reduction in the boost factor corresponds to a volume of brake fluid displaced into the at least one storage chamber.

12. The hydraulic braking system as recited in claim 5, wherein a reduction in a boost factor of a brake booster occurs when the brake actuating element is activated in the first operating mode, and wherein the reduction in the boost factor corresponds to a volume of brake fluid displaced into the at least one storage chamber.

13. The method as recited in claim 7, wherein a reduction in a boost factor of a brake booster occurs when the brake actuating element is activated in the first operating mode, and wherein the reduction in the boost factor corresponds to a volume of brake fluid displaced into the at least one storage chamber.

14. The control device as recited in claim 1, wherein the at least one first brake pressure that is limitable by the displacing of brake fluid into the at least one storage chamber via the at least one blending valve is prevented from increasing above a predetermined pressure during the activation of the brake actuating element in the first operating mode, and wherein no reduction of the at least one first brake pressure occurs during the activation of the actuating element in the first operating mode.

* * * * *